Dec. 17, 1940.                C. H. WILLIS                2,225,360
            ELECTRIC VALVE FREQUENCY CONVERTING SYSTEM
                       Filed Oct. 11, 1938
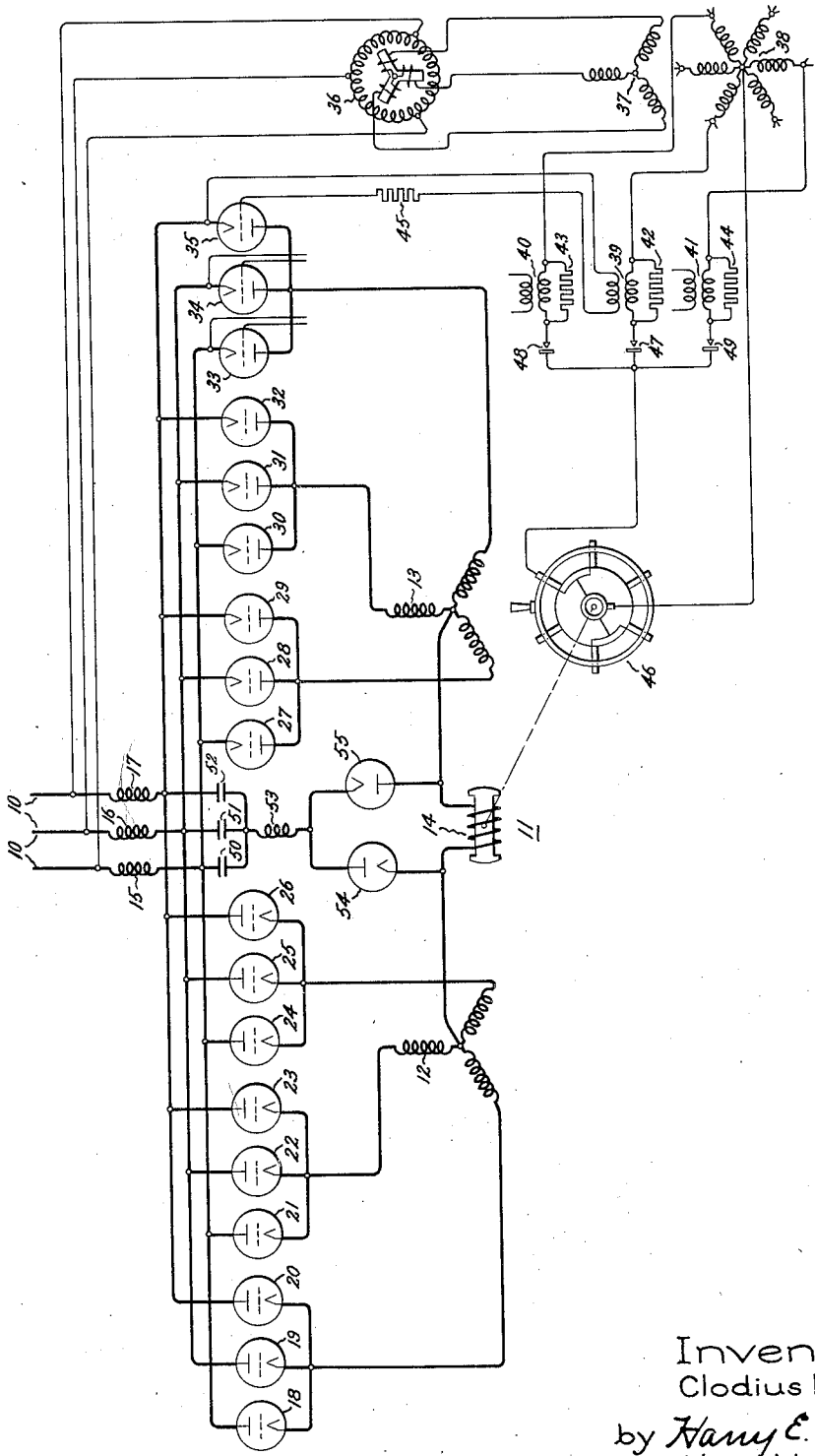
Inventor:
Clodius H. Willis,
by Harry E. Dunham
His Attorney.

Patented Dec. 17, 1940

2,225,360

UNITED STATES PATENT OFFICE 2,225,360

ELECTRIC VALVE FREQUENCY CONVERTING SYSTEM

Clodius H. Willis, Princeton, N. J., assignor to General Electric Company, a corporation of New York Application October 11, 1938, Serial No. 234,447

7 Claims. (Cl. 172—274)

My invention relates to electric valve frequency converting systems, and more particularly to such systems adapted to transmit energy from an alternating current supply circuit to a dynamo-electric machine or synchronous type alternating current motor.

Heretofore electric valve frequency converting systems have been utilized to supply energy to an alternating current motor of the synchronous type and the speed of the motor was controlled by varying the frequencies of the output current of the electric valve converting system. In such systems where the field excitation of the motor is of the series type the field current comprises unidirectional current impulses so that at low speeds of the motor the field excitation is not steady. It would be desirable if some means were provided for maintaining a relatively steady field excitation of the motor at all speeds.

It is therefore an object of my invention to provide an improved electric valve frequency converting system for supplying energy to an alternating current motor which will overcome certain limitations of the arrangements of the prior art, and which will be efficient and reliable in operation.

It is a further object of my invention to provide an improved electric valve frequency converting system for operating a variable speed motor having a relatively constant field excitation at low speeds of the motor.

Another object of my invention is to provide an improved electric valve converting system supplying energy to a series excited motor which will have improved power factor operating characteristics.

In accordance with my invention this may be accomplished by supplying additional excitation components to the field winding of the motor by means of a capacitive network and a plurality of auxiliary valves. From another aspect my invention provides, by means of the capacitive network and the auxiliary valves, for the transfer of current between the alternating current source and the circuit between the neutrals of the groups of phase windings or the terminals of the field winding. This means that the current flowing through one of the groups of phase windings and the field winding need not always be equal to the current flowing through the other group of phase windings and that the capacitive network and the auxiliary valves form, in effect, a by-pass for one of the groups of phase windings. Such an arrangement operates to improve the power factor of both the motor and the electric valve frequency converting system.

The novel features which I believe to be characteristic of my invention are set forth with particularity in the appended claims. My invention itself, however, both as to its organization and method of operation, together with further objects and advantages thereof, will be better understood by reference to the following description taken in connection with the accompanying drawing in which the single figure thereof is a diagrammatic representation of an electric valve frequency converting apparatus which embodies my invention.

Referring now to the drawing I have shown therein an alternating current source 10, and an alternating current motor 11 which comprises a plurality of phase windings 12 and 13 and a field winding 14 connected between these phase windings. The alternating current motor 11 which is of the synchronous type is energized from the alternating current source 10 by an electric valve frequency converting system which includes a plurality of smoothing reactors or inductors 15, 16 and 17 each connected in series with one of the phase conductors of the alternating current circuit 10. The motor phase windings 12 and 13 are arranged in star relation and each phase winding is provided with a group of electric valves, one electrode of which is connected to a different one of the phase conductors of the alternating current supply circuit. Thus for example, one of the phase windings of the polyphase network 12 of the motor is provided with a group of valves 18, 19 and 20, the cathodes of which are connected together to one terminal of the phase winding and the anodes of which are each connected to a different one of the phase conductors of the alternating current supply circuit 10 through the inductors 15, 16 and 17. A second group of valves 21, 22 and 23 is similarly connected to another one of the phase windings and still another group of valves 24, 25 and 26 is similarly connected to supply the remaining phase winding of the polyphase network 12 of the alternating current motor 11. Each of the windings of the polyphase network 13 of the alternating current motor 11 is also provided with a group of three valves each arranged to be conductive in a direction opposite to the valves associated with the other polyphase network 12. For example, a group of valves 27, 28 and 29 is arranged so that all their anodes are connected together to one terminal of one of the windings of the polyphase network 13 and each of the cathodes of these valves is connected to a different phase conductor of the alternating current circuit 10 through one of the smoothing reactors 15, 16 and 17. A second group of valves 30, 31 and 32, similarly connected, control the flow of energy through one of the other phase windings and a third group of valves 33, 34 and 35, similarly connected, control the flow of energy through the remaining phase windings of the polyphase network 13 of the alternating current motor 11. For the purposes of illustration each of the valves 18 to 35 has been shown as comprising an anode, a cathode and a control grid. It is to be understood that any other valves may be used as will be understood by those skilled in the art, although it is preferable to utilize valves having an anode, a cathode and a control electrode contained within an envelope having therein an ionizable medium. The circuit arrangement thus far described corresponds to one of the circuit arrangements disclosed in the United States Letters Patent Reissue 20,364 of May 18, 1937.

In order to control the conductivities of the various valves 18 to 35 there is provided a control system which includes a phase shifting device 36 energized from the alternating current circuit 10 and which is arranged to energize a transformer having a primary winding 37 and a secondary winding 38. The secondary winding 38 supplies energy to a plurality of control transformers such as 39, 40 and 41, the primary windings of which may be provided with shunt resistors 42, 43 and 44, respectively. For the purposes of simplicity only sufficient transformers have been shown to control a group of valves such as valves 33, 34 and 35, the latter valve showing that the secondary winding of the control transformer, such as 39, is connected between the cathode and control grid of the valve and this circuit may include a suitable current limiting resistor such as 45. In order that these control transformers be energized in accordance with the speed of the alternating current motor 11 there is provided on the shaft of the motor a distributor having a plurality of brushes each brush controlling a group of transformers arranged to control the moments of ignition of a group of valves. The conducting segments of the distributor 46 are connected by means of a suitable brush to the neutral point of the secondary winding 38 and the outer extremities of the proper phase windings are connected in series through the primary winding of the transformers 39, 40 and 41 through a plurality of unilaterally conductive devices 47, 48, and 49, respectively, to one of the distributing brushes of the distributor 46. While the control system shown is similar to that disclosed and claimed in United States Letters Patent No. 1,971,833 granted August 28, 1934, upon the application of Earl L. Phillipi, for Electric valve converting system and excitation apparatus therefor, and which is assigned to the same assignee as the present application, any other suitable control system may be utilized in order to render conductive the various valves in the proper sequence so that the windings of the phase windings 12 and 13 may become energized in proper sequence in accordance with the speed of the motor 11.

The operation of the apparatus thus far described will be apparent to those skilled in the art with the following brief explanation although a more detailed description of the mode of operation is available in the patents referred to. For example, it may be assumed that one of the valves of the group of valves 18, 19 and 20 has been rendered conductive so as to transmit current through to one of the windings of the polyphase winding group 12 of the motor through the field winding 14 and through one of the windings of the polyphase network 13 of the motor to one of the valves of the group of valves 30, 31 and 32. Since the valves which are connected to the windings of the phase network 12 always conduct current in the same direction, the flow of energy through the field winding 14 will be unidirectional and each of the phase networks 12 and 13 will be energized by unidirectional current impulses having such frequency as to produce an alternating current field in these windings. At the lower speeds of the motor 11 the torque of the motor obviously will not be as steady as at the higher speeds due to the pulsations of power in the field 14. Therefore, in accordance with my invention I provide a polyphase capacitance network comprising a capacitor 50, 51 and 52 arranged in a star network the outer extremities of which are connected to the various phase conductors of the alternating current circuit 10 through the reactors 15, 16 and 17. The neutral point of this capacitance network is connected through a reactor 53 to a pair of valves 54 and 55. The anode of the valve 54 is connected to the reactor 53 and the cathode thereof is connected to one side of the field winding 14. The other side of the field winding 14 is connected to the anode of the valve 55 the cathode thereof being connected to the reactor 53. The valves 54 and 55 are of the rectifier type having an anode and a cathode enclosed within an envelope containing an ionizable medium but, as is apparent to those skilled in the art, other rectifying means may be substituted therefor. The conductivities of the various valves associated with the polyphase network 12 for instance, have moments of ignition which are displaced in phase from the moments of ignition of the various valves associated with the polyphase network 13 and hence at low speed there is provided by means of my invention a path whereby at times a certain portion of the energy of the phase network 12 may be transmitted through the field winding 14, the valve 55, the smoothing reactor 53 and one of the capacitors of the capacitance network 50, 51 and 52, back to the alternating current supply circuit 10. At other times there will be a component of energy transmitted through one of the capacitors of the networks 50, 51 and 52 through the smoothing reactor 53, the valve 54, the field winding 14 and the polyphase network 13. Thus the capacitance network and the pair of valves associated with the field winding 14 operate to supply thereto certain components of energy which serve to maintain a more uniform flow of energy through the field winding 14 thereby providing a steadier motor torque at low speed. These components of energy supplied by this apparatus also serve to improve the power factor of the motor 11 and also operate to improve the power factor of the electric valve converting system.

While I have shown a particular application of my invention to an electric valve frequency converting apparatus, it is to be understood that this is merely illustrative as one of a number of electric valve converting or translating apparatus to which my invention may be applied. It will, of course, be understood that I do not wish to be limited thereto, since it is apparent that the principles herein disclosed are susceptible of numerous other applications, and modifications may be made in the circuit arrangements to which my invention may be applied without departing from the spirit and scope of my invention as set forth in the appended claims.

What I claim as new and desire to secure by Letters Patent of the United States is:

1. In combination, a source of polyphase alternating current, a dynamo-electric machine provided with a plurality of phase windings and an electric circuit including a field winding connected therebetween so as to be energized by current flowing between said phase windings, a group of valves for each of said phase windings for interconnecting said windings and said source, and means interconnecting said source and said field winding for transmitting therebetween at least a portion of the current transmitted by one of said phase windings and said field winding.

2. In combination, a source of polyphase alternating current, a dynamo-electric machine provided with a plurality of groups of phase windings each group provided with a neutral terminal and a field winding connected between said neutral terminals, a group of valves for each of said groups of phase windings for interconnecting said windings and said source, and means including a unilaterally conducting device interconnecting said source and one terminal of said field winding for transmitting therebetween at least a portion of the current transmitted through one of said groups of phase windings and said field winding independently of the current transmitted by the other of said groups of phase windings.

3. In combination, a source of polyphase alternating current, a dynamo-electric machine provided with a plurality of groups of phase windings each group including a neutral terminal and a field winding connected between said neutral terminals, an electric valve converting system including a group of valves for each group of phase windings, said groups of valves interconnecting said phase windings with said source, and means for transmitting current between said source and the electric circuit connecting the neutral terminals of said groups of phase windings including means for establishing a neutral connection electrically associated with said source and a pair of reversely connected unilaterally conducting devices interconnecting said neutral connection with the opposite terminals of said field windings.

4. In combination, a source of polyphase alternating current, a dynamo-electric machine provided with a plurality of groups of phase windings each group provided with a neutral terminal and a field winding connected between said neutral terminals, an electric valve converting system interconnecting said machine with said source, said system including a group of valves for each of said groups of phase windings, and means interconnecting said source and the neutral terminals of said groups of phase windings for transmitting current therebetween, said means being effective to transmit current between said source and one of said neutrals in one direction and between said source and the other of said neutrals in the opposite direction.

5. In combination, a source of polyphase alternating current, a dynamo-electric machine provided with a plurality of phase windings and a field winding connected therebetween, an electric valve converting system interconnecting said machine with said source of current, said system including a group of valves for each winding of said plurality of phase windings, and means including a plurality of capacitors and a plurality of electric valves for interconnecting said source with said field winding for supplying thereto energy components thereby to improve the power factor of said machine and the power factor of said electric valve converting system.

6. In combination, a source of polyphase alternating current, a dynamo-electric machine provided with a plurality of phase windings and a field winding connected therebetween, an electric valve converting system interconnecting said machine with said source of current, a polyphase capacitive network connected to said source, and a pair of electric valves interconnecting said network with said field winding for producing a relatively steady flow of energy therethrough.

7. In combination, a source of polyphase alternating current, a plurality of groups of phase windings having a neutral terminal and a field winding connected therebetween, a plurality of electric valves interconnecting said source of alternating current and the phase windings of each of said groups for controlling the time of energization of the phase windings of each group independently of the time of energization of the phase windings of the other group, and means interconnecting said field winding and said source of alternating current for transmitting current therebetween to permit the current transmitted by one of said phase windings and said field winding to vary independently of the current transmitted by the other of said groups of phase windings.

CLODIUS H. WILLIS.